US012809292B2

(12) United States Patent
Yamamoto

(10) Patent No.: US 12,809,292 B2
(45) Date of Patent: Nov. 24, 2026

(54) IMAGE FORMING APPARATUS AND OPERATION CONTROL METHOD THAT EACH ALLOW OPERATION OF REMOVING SHEET WOUND AROUND FIXING MEMBER TO BE FACILITATED

(71) Applicant: KYOCERA Document Solutions Inc., Osaka (JP)

(72) Inventor: Minori Yamamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 14 days.

(21) Appl. No.: 19/439,242

(22) Filed: Jan. 2, 2026

(65) Prior Publication Data

US 2026/0194846 A1 Jul. 9, 2026

(30) Foreign Application Priority Data

Jan. 8, 2025 (JP) ................................ 2025-002692

(51) Int. Cl.

| | |
|---|---|
| ***G03G 15/20*** | (2006.01) |
| ***G03G 15/00*** | (2006.01) |
| ***G03G 21/16*** | (2006.01) |

(52) U.S. Cl.

CPC ..... *G03G 15/2035* (2013.01); *G03G 15/2017* (2013.01); *G03G 15/2028* (2013.01); *G03G 15/2064* (2013.01); *G03G 15/5012* (2013.01); *G03G 15/657* (2013.01); *G03G 15/6573* (2013.01); *G03G 15/70* (2013.01); *G03G 21/1638* (2013.01); *G03G 2215/00548* (2013.01); *G03G 2215/00573* (2013.01);

(Continued)

(58) Field of Classification Search

CPC .......... G03G 15/2017; G03G 15/2028; G03G 15/2035; G03G 15/2064; G03G 15/5012; G03G 15/657; G03G 15/6573; G03G 15/70; G03G 21/1638; G03G 2215/00548; G03G 2215/00573; G03G 2215/00599; G03G 2215/00603

See application file for complete search history.

(56) References Cited

U.S. PATENT DOCUMENTS

| | | | | |
|---|---|---|---|---|
| 2013/0209121 | A1* | 8/2013 | Uchitani | G03G 15/205 399/67 |
| 2025/0102976 | A1* | 3/2025 | Hashimoto | G03G 15/2028 |
| 2025/0291296 | A1* | 9/2025 | Shinoya | G03G 15/6582 |

FOREIGN PATENT DOCUMENTS

| | | |
|---|---|---|
| JP | 2013064961 A | 4/2013 |

* cited by examiner

*Primary Examiner* — Joseph S Wong
(74) *Attorney, Agent, or Firm* — Alleman Hall LLP

(57) ABSTRACT

An image forming apparatus includes a first sensing portion, a stop processing portion, and a rotation processing portion. The first sensing portion senses a sheet on a downstream side of the fixing nip portion in a conveyance direction of the sheet. The stop processing portion stops an image formation process in a case where the first sensing portion does not sense the sheet before a specific time elapses after a timing at which a front end of the sheet in the conveyance direction reaches the fixing nip portion while the image formation process is in execution. The rotation processing portion reversely rotates a fixing member by an amount of rotation corresponding to a difference between a specific distance and length of the sheet in the conveyance direction in a case where the image formation process is stopped and the length is less than the specific distance.

6 Claims, 5 Drawing Sheets

(52) U.S. Cl.
CPC ............ *G03G 2215/00599* (2013.01); *G03G 2215/00603* (2013.01)

IMAGE FORMING APPARATUS AND OPERATION CONTROL METHOD THAT EACH ALLOW OPERATION OF REMOVING SHEET WOUND AROUND FIXING MEMBER TO BE FACILITATED

INCORPORATION BY REFERENCE

This application is based upon and claims the benefit of priority from the corresponding Japanese Patent Application No. 2025-002692 filed on Jan. 8, 2025, the entire contents of which are incorporated herein by reference.

BACKGROUND

This disclosure relates to an image forming apparatus and an operation control method.

An electrophotographic image forming apparatus includes a fixing part that fixes a toner image transferred to a sheet onto the sheet. The fixing part includes a fixing member such as a fixing roller and a pressure member such as a pressure roller that forms a fixing nip portion between the fixing member and the pressure member.

In the fixing part, a winding jam that the sheet is wound around the fixing member occurs in some cases. For this, the image forming apparatus that reversely rotates the fixing member in the case of the occurrence of the winding jam to solve the condition that the front end of the sheet is wound around the fixing member once or more has been known as the related art.

SUMMARY

An image forming apparatus according to an aspect of this disclosure includes a fixing member, a pressure member, a first sensing portion, a stop processing portion, and a rotation processing portion. The fixing member comes into contact with a sheet to which a toner image is transferred and fixes the toner image onto the sheet. The fixing member is provided so as to be rotatable. The pressure member is provided to be opposed to the fixing member such that the pressure member is rotatable. The pressure member forms a fixing nip portion between the fixing member and the pressure member. The fixing nip portion pressurizes the sheet. The first sensing portion senses the sheet on a downstream side of the fixing nip portion in a conveyance path of the sheet in a conveyance direction of the sheet. The conveyance path extends through the fixing nip portion. The stop processing portion stops an image formation process of forming an image on the sheet in a case where the first sensing portion does not sense the sheet before a specific time defined in advance elapses after a timing at which a front end of the sheet in the conveyance direction reaches the fixing nip portion while the image formation process is in execution. The rotation processing portion reversely rotates the fixing member by an amount of rotation corresponding to a difference between a specific distance and length of the sheet in the conveyance direction in a case where the stop processing portion stops the image formation process and the length is less than the specific distance. The specific distance is greater than a product of the specific time and conveyance speed of the sheet.

An operation control method according to another aspect of the present disclosure is executed by an image forming apparatus including a fixing member, a pressure member, and a first sensing portion. The fixing member comes into contact with a sheet to which a toner image is transferred and fixes the toner image onto the sheet. The fixing member is provided so as to be rotatable. The pressure member is provided to be opposed to the fixing member such that the pressure member is rotatable. The pressure member forms a fixing nip portion between the fixing member and the pressure member. The fixing nip portion pressurizes the sheet. The first sensing portion senses the sheet on a downstream side of the fixing nip portion in a conveyance path of the sheet in a conveyance direction of the sheet. The conveyance path extends through the fixing nip portion. The operation control method includes a stop step and a rotation step. In the stop step, an image formation process of forming an image on the sheet is stopped in a case where the first sensing portion does not sense the sheet before a specific time defined in advance elapses after a timing at which a front end of the sheet in the conveyance direction reaches the fixing nip portion while the image formation process is in execution. In the rotation step, the fixing member is reversely rotated by an amount of rotation corresponding to a difference between a specific distance and length of the sheet in the conveyance direction in a case where the image formation process is stopped in the stop step and the length is less than the specific distance. The specific distance is greater than a product of the specific time and conveyance speed of the sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described with reference to the accompanying drawings. It is noted that the following embodiment is a specific example of this disclosure and does not limit the technical scope of this disclosure.

[Configuration of Image Forming Apparatus 100]

First, the configuration of an image forming apparatus 100 according to the embodiment of this disclosure will be described with reference to FIGS. 1 and 2.

It is noted that the perpendicular direction viewed with the image forming apparatus 100 placed in an installation state (state shown in FIG. 1) that allows the image forming apparatus 100 to be used is defined as an up-down direction D1 for the convenience of description. In addition, a front-back direction D2 is defined using the surface of the image forming apparatus 100 shown in FIG. 1 corresponding to the left of FIG. 1 as a front (front surface). Furthermore, a left-right direction D3 is defined on the basis of the front of the image forming apparatus 100 in the installation state.

The image forming apparatus 100 is a multifunction peripheral having a plurality of functions such as a facsimile function and a copy function along with a scan function of reading an image on a document sheet and a print function of forming an image on the basis of image data. It is noted that this disclosure may be applied to an image forming apparatus such as a printer, a facsimile apparatus, and a copier.

Figure 1:
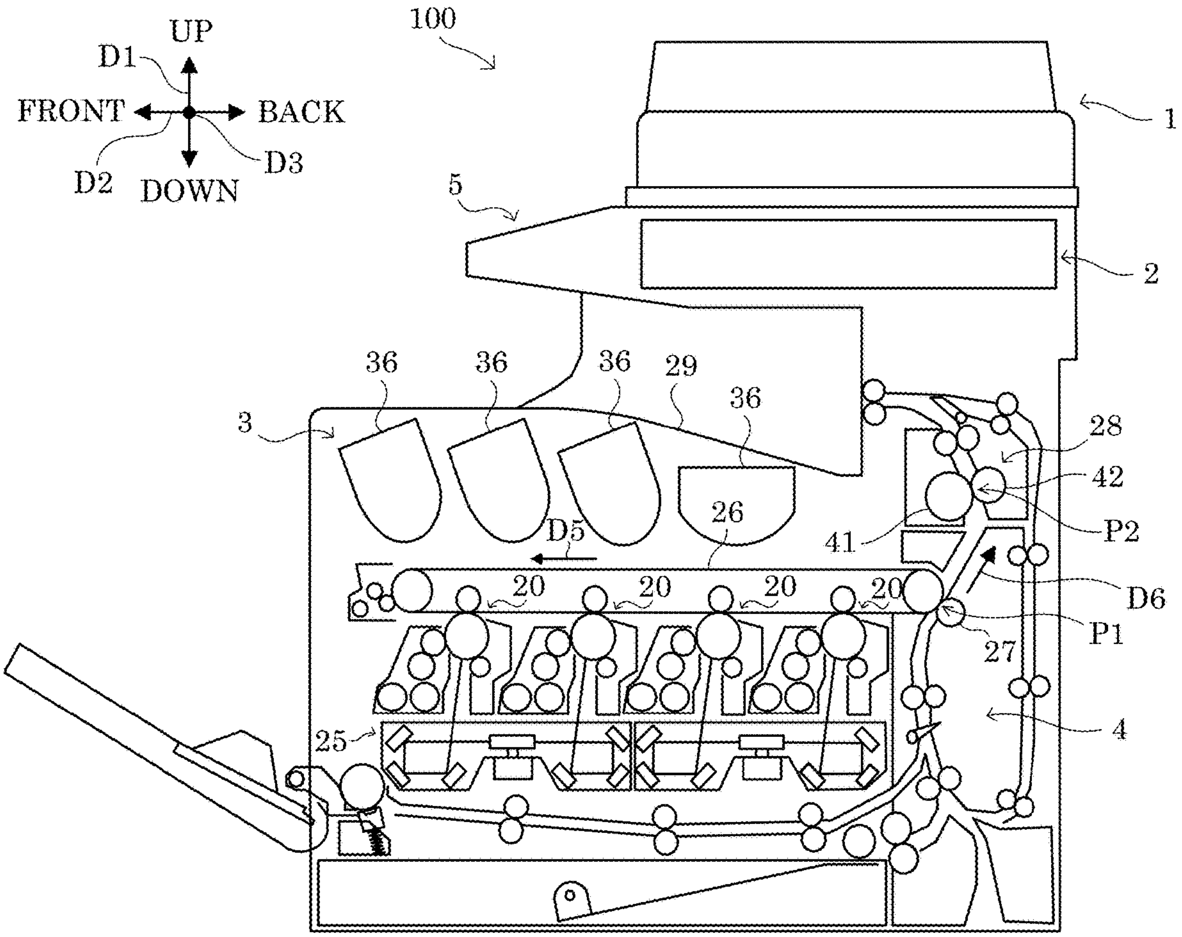
FIG. 1 is a cross-sectional view of a configuration of an image forming apparatus according to an embodiment of this disclosure.
Figure 2:
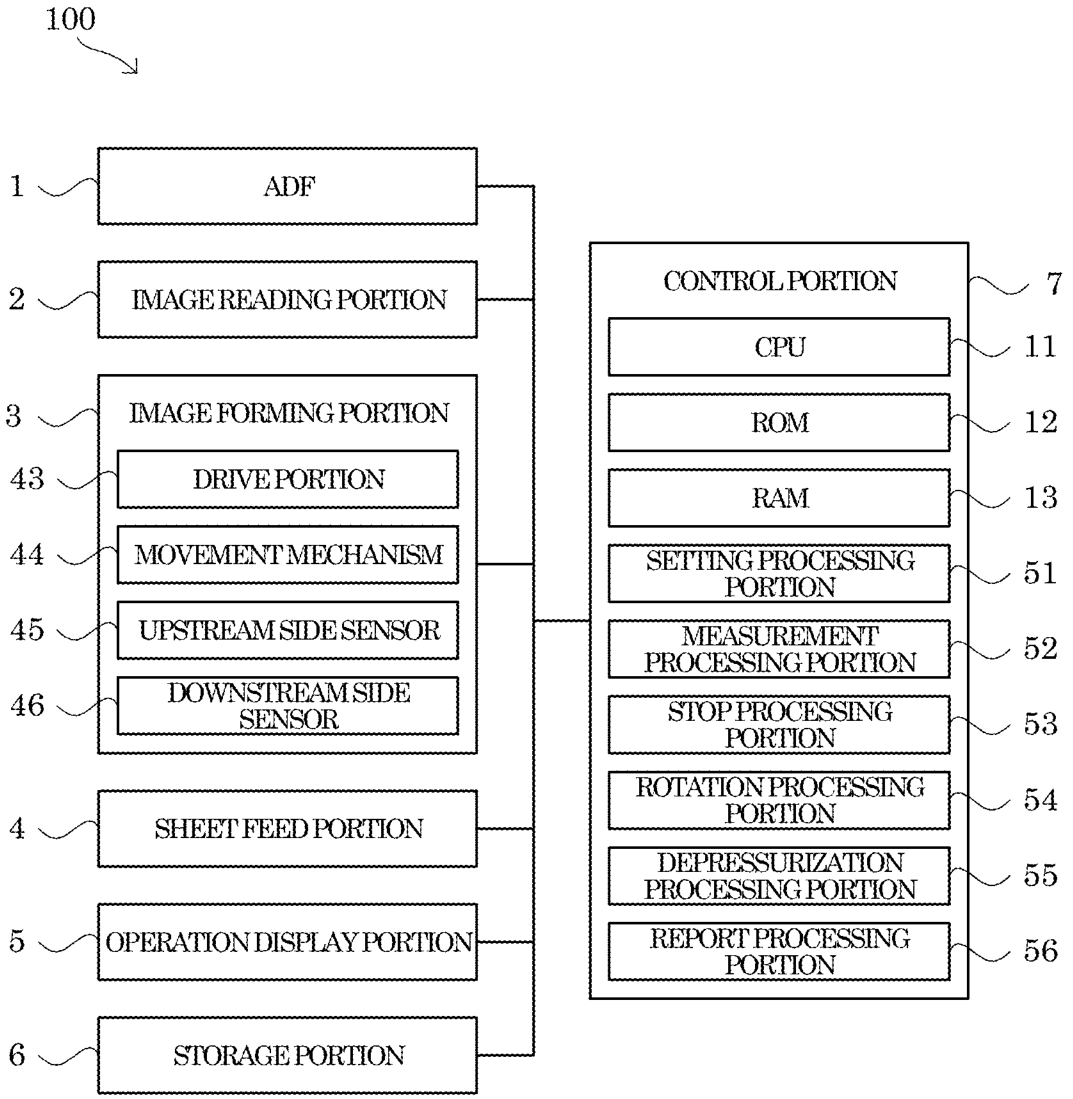
FIG. 2 is a block diagram showing a system configuration of the image forming apparatus according to the embodiment of this disclosure.

As shown in FIGS. 1 and 2, the image forming apparatus 100 includes an auto document feeder (ADF) 1, an image reading portion 2, an image forming portion 3, a sheet feed portion 4, an operation display portion 5, a storage portion 6, and a control portion 7.

The ADF 1 conveys a document sheet to be read by the scan function. The ADF 1 includes a document sheet set portion, a plurality of conveying rollers, a document sheet holder, and a sheet discharge portion.

The image reading portion 2 achieves the scan function. The image reading portion 2 includes a document sheet table, a light source, a plurality of mirrors, an optical lens, and a charge coupled device (CCD).

The image forming portion 3 achieves the print function. Specifically, the image forming portion 3 forms a color or monochrome image on a sheet supplied from the sheet feed portion 4 in accordance with electrophotography.

The sheet feed portion 4 supplies a sheet to the image forming portion 3. The sheet feed portion 4 includes a sheet feed cassette, a manual feed tray, and a plurality of conveying rollers.

The operation display portion 5 is a user interface of the image forming apparatus 100. The operation display portion 5 includes a display portion and an operation portion. The display portion displays various kinds of information in response to a control instruction from the control portion 7. For example, the display portion is a display device such as a liquid-crystal display. The operation portion inputs various kinds of information to the control portion 7 in response to an operation of a user. For example, the operation portion is an operation device including an operation key and a touch panel.

The storage portion 6 is a non-volatile storage device. For example, the storage portion 6 is a flash memory.

The control portion 7 integrally controls the image forming apparatus 100. As shown in FIG. 2, the control portion 7 includes a CPU 11, a ROM 12, and a RAM 13. The CPU 11 is a processor that executes various calculation processes. The ROM 12 is a non-volatile storage device that stores in advance information about a control program or the like for causing the CPU 11 to execute various processes. The RAM 13 is a volatile or non-volatile storage device that is used as a temporary storage memory (work area) for various processes which are executed by the CPU 11. The CPU 11 integrally controls the image forming apparatus 100 by executing various control programs stored in advance in the ROM 12.

It is noted that the control portion 7 may be a control portion provided separately from a main control portion which integrally controls the image forming apparatus 100. In addition, the control portion 7 may be composed of an electronic circuit such as an integrated circuit (ASIC).

[Configuration of Image Forming Portion 3]

Figure 3:
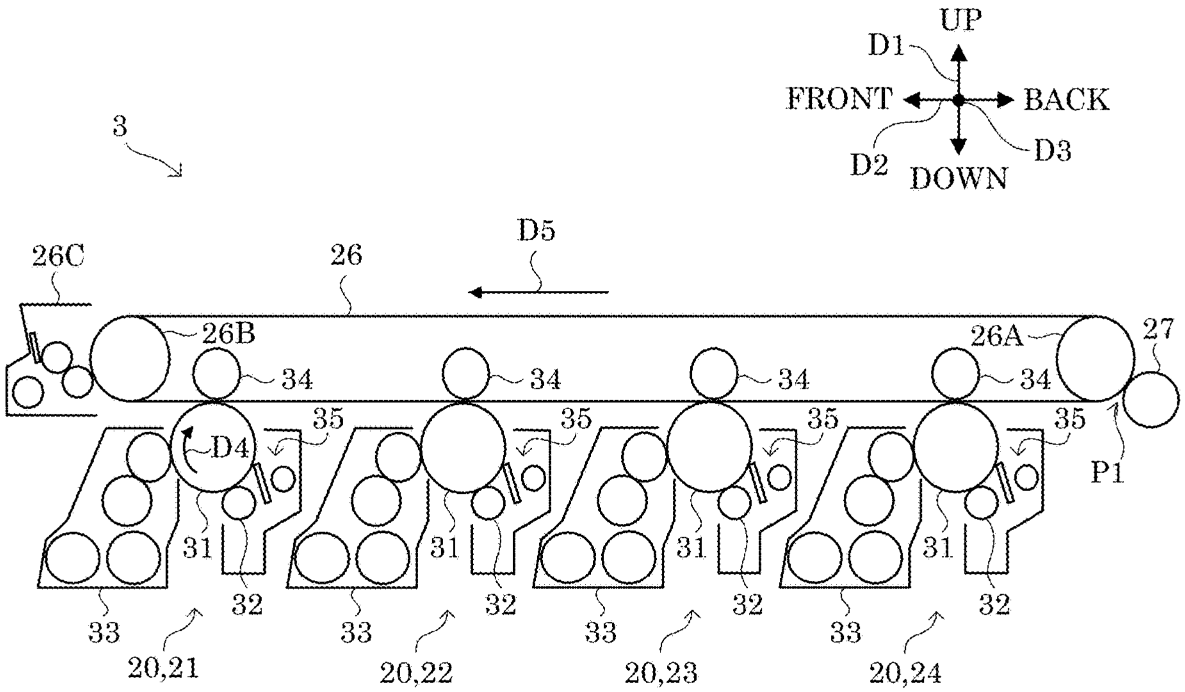
FIG. 3 is a cross-sectional view of a configuration of an image forming portion of the image forming apparatus according to the embodiment of this disclosure.
Figure 4:
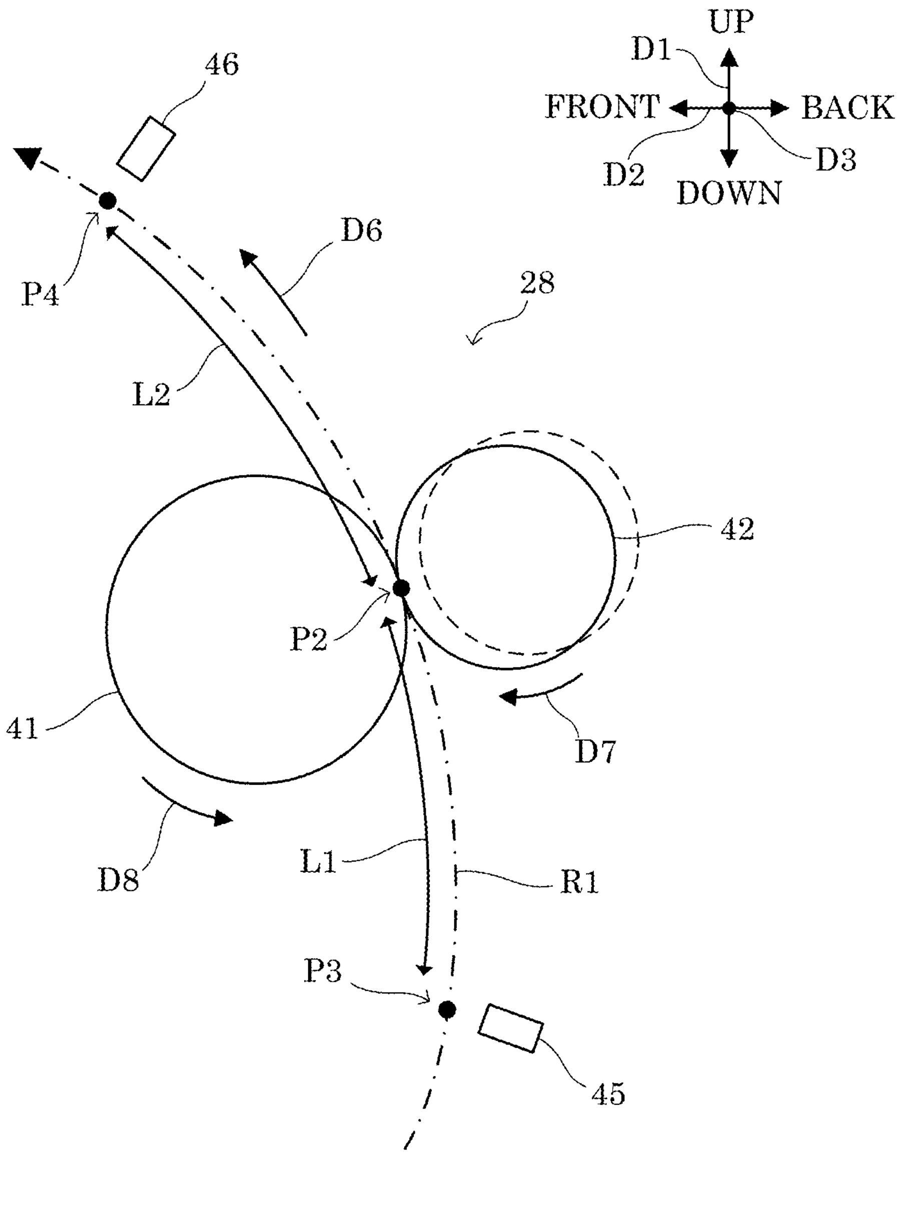
FIG. 4 is a cross-sectional view of a configuration of a fixing device of the image forming apparatus according to the embodiment of this disclosure.

Next, the configuration of the image forming portion 3 will be described with reference to FIGS. 1 to 4. Here, FIG. 3 is a cross-sectional view of the configurations of a plurality of image forming units 20, an intermediate transfer belt 26, and a secondary transfer roller 27. In addition, FIG. 4 is a diagram showing a conveyance path R1 of a sheet extending through a fixing nip portion P2. It is noted that FIG. 4 shows the conveyance path R1 using a one-dot chain line. In addition, FIG. 4 shows a pressure roller 42 disposed at a separate position using a dashed line.

As shown in FIG. 1, the image forming portion 3 includes the four image forming units 20, a laser scanning unit 25, the intermediate transfer belt 26, the secondary transfer roller 27, a fixing device 28, and a sheet discharge tray 29.

Of the four image forming units 20, an image forming unit 21 (see FIG. 3) forms a toner image of Y (yellow). Of the four image forming units 20, an image forming unit 22 (see FIG. 3) forms a toner image of C (cyan). Of the four image forming units 20, an image forming unit 23 (see FIG. 3) forms a toner image of M (magenta). Of the four image forming units 20, an image forming unit 24 (see FIG. 3) forms a toner image of K (black). That is, the image forming portion 3 forms an image on a sheet using the respective toners of C, M, Y, and K. As shown in FIGS. 1 and 3, the four image forming units 20 are provided side by side along the front-back direction D2 in the order of yellow, cyan, magenta, and black from the front side of the image forming apparatus 100.

As shown in FIG. 3, each of the image forming units 20 includes a photoconductor drum 31, a charging roller 32, a developing device 33, a primary transfer roller 34, and a drum cleaning portion 35. In addition, each of the image forming units 20 includes a toner container 36 shown in FIG. 1.

An electrostatic latent image is formed on the surface of the photoconductor drum 31. For example, the photoconductor drum 31 includes a photosensitive layer formed using amorphous silicon. The photoconductor drum 31 rotates in a rotation direction D4 shown in FIG. 3 upon receiving rotational driving force supplied from an unillustrated motor. This causes the photoconductor drum 31 to convey the electrostatic latent image formed on the surface.

The charging roller 32 charges the surface of the photoconductor drum 31 upon receiving the application of a charging voltage set in advance. For example, the charging roller 32 positively charges the surface of the photoconductor drum 31. The surface of the photoconductor drum 31 charged by the charging roller 32 is irradiated with light emitted from the laser scanning unit 25 and based on image data. This forms an electrostatic latent image on the surface of the photoconductor drum 31.

The developing device 33 develops the electrostatic latent image formed on the surface of the photoconductor drum 31. The developing device 33 includes a pair of stirring members, a magnet roller, and a developing roller. The pair of stirring members stirs a developer stored inside the developing device 33. The developer includes toner and carriers. This positively charges the toner included in the developer because of the friction with the carriers included in the developer. The magnet roller draws up the developer stirred by the pair of stirring members and supplies the toner included in the developer to the developing roller. The developing roller conveys the toner supplied from the magnet roller to the position opposed to the photoconductor drum 31. In addition, the developing roller supplies the photoconductor drum 31 with the toner conveyed to the opposed position upon receiving the application of a developing bias voltage set in advance. This visualizes (develops) the electrostatic latent image formed on the surface of the photoconductor drum 31. It is noted that the developing device 33 is supplied with the toner from the toner container 36.

The primary transfer roller 34 transfers a toner image formed on the surface of the photoconductor drum 31 to the outer peripheral surface of the intermediate transfer belt 26 upon receiving the supply of a primary transfer current set in advance. As shown in FIG. 3, the primary transfer roller 34 is provided to face the photoconductor drum 31 across the intermediate transfer belt 26.

The drum cleaning portion 35 removes the toner remaining on the surface of the photoconductor drum 31 after the primary transfer roller 34 transfers the toner image.

The laser scanning unit 25 emits the light based on the image data toward the surface of the photoconductor drum 31 of each of the image forming units 20.

The intermediate transfer belt 26 is an endless belt member to which the toner image formed on the surface of the photoconductor drum 31 of each of the image forming units 20 is transferred. The intermediate transfer belt 26 is stretched under predetermined tension by a drive roller 26A (see FIG. 3) and a stretching roller 26B (see FIG. 3). The drive roller 26A rotates upon receiving rotational driving force supplied from an unillustrated motor, thereby rotating the intermediate transfer belt 26 in a rotation direction D5 shown in FIG. 3. This causes the intermediate transfer belt 26 to convey the toner image formed on the outer peripheral surface to a secondary transfer position P1 (see FIG. 3) by the secondary transfer roller 27. It is noted that the outer peripheral surface of the intermediate transfer belt 26 after the secondary transfer roller 27 transfers the toner image is cleaned by a belt cleaning device 26C shown in FIG. 3.

The secondary transfer roller 27 transfers the toner image transferred to the outer peripheral surface of the intermediate transfer belt 26 to a sheet supplied from the sheet feed portion 4 upon receiving the supply of a secondary transfer current set in advance. As shown in FIG. 3, the secondary transfer roller 27 is provided to face the drive roller 26A across the intermediate transfer belt 26. The secondary transfer roller 27 is biased by an unillustrated biasing member toward the drive roller 26A to come into contact with the intermediate transfer belt 26 at nip pressure defined in advance. The secondary transfer roller 27 transfers the toner image formed on the intermediate transfer belt 26 to a sheet at the secondary transfer position P1 (see FIG. 3) at which the secondary transfer roller 27 comes into contact with the intermediate transfer belt 26. The sheet to which the toner image is transferred at the secondary transfer position P1 is conveyed in a conveyance direction D6 (see FIG. 1) toward the fixing nip portion P2 (see FIG. 1).

The fixing device 28 fixes the toner image transferred to the sheet by the secondary transfer roller 27 onto the sheet.

As shown in FIGS. 1 and 4, the fixing device 28 includes a fixing roller 41 and a pressure roller 42. In addition, the fixing device 28 includes a drive portion 43 and a movement mechanism 44 shown in FIG. 2.

The fixing roller 41 is provided so as to be rotatable. The fixing roller 41 comes into contact with a sheet to which a toner image is transferred and fixes the toner image onto the sheet. The fixing roller 41 is an example of a fixing member according to this disclosure. It is noted that the fixing member according to this disclosure does not have to be limited to a roller shape.

The pressure roller 42 is provided so as to be rotatable while facing the fixing roller 41. In addition, the pressure roller 42 forms the fixing nip portion P2 (see FIGS. 1 and 4) that pressurizes a sheet between the fixing roller 41 and the pressure roller 42. Specifically, the pressure roller 42 is provided so as to be movable between a contact position (see FIG. 4) at which the pressure roller 42 comes into contact with the fixing roller 41 and the separate position (see the dashed line in FIG. 4) separate from the contact position. In addition, the pressure roller 42 is biased by an unillustrated biasing member in the direction from the separate position to the contact position. The pressure roller 42 is an example of a pressure member according to this disclosure. It is noted that the pressure member according to this disclosure does not have to be limited to a roller shape.

The drive portion 43 rotates the pressure roller 42 in a rotation direction D7 shown in FIG. 4. The drive portion 43 is a motor. The drive portion 43 is rotatable in both positive and opposite directions.

The pressure roller 42 rotates in the rotation direction D7 upon receiving rotational driving force supplied from the drive portion 43, thereby rotating the fixing roller 41 in a rotation direction D8 shown in FIG. 4 in a driven manner.

There is provided an unillustrated heater inside the fixing roller 41. The heater heats the fixing roller 41 to fixing temperature defined in advance. The fixing roller 41 is heated to the fixing temperature, thereby pressurizing and heating a sheet passing through the fixing nip portion P2. This fixes a toner image transferred to a sheet onto the sheet.

The movement mechanism 44 moves the pressure roller 42 between the contact position and the separate position. For example, the movement mechanism 44 includes a motor and a cam that rotates upon receiving rotational driving force supplied from the motor to change the position of the pressure roller 42 between the contact position and the separate position.

As shown in FIG. 4, the conveyance path R1 of a sheet extending through the fixing nip portion P2 is provided with an upstream-side sensor 45 and a downstream-side sensor 46.

The upstream-side sensor 45 senses a sheet at a sensing position P3 (see FIG. 4) located on the upstream side of the fixing nip portion P2 in the conveyance path R1 in the conveyance direction D6 of a sheet. The sensing position P3 is a position between the secondary transfer position P1 (see FIG. 1) and the fixing nip portion P2 (see FIG. 1) in the conveyance path R1. For example, the upstream-side sensor 45 is a reflective or transmissive optical sensor. The upstream-side sensor 45 is an example of a second sensing portion according to this disclosure.

The downstream-side sensor 46 senses a sheet at a sensing position P4 (see FIG. 4) located on the downstream side of the fixing nip portion P2 in the conveyance path R1 in the conveyance direction D6 of a sheet. For example, the downstream-side sensor 46 is a reflective or transmissive optical sensor. The downstream-side sensor 46 is an example of a first sensing portion according to this disclosure.

A sheet onto which the fixing device 28 fixes a toner image is discharged to the sheet discharge tray 29.

Incidentally, the fixing device 28 undergoes a winding jam that a sheet is wound around the fixing roller 41 in some cases. For this, an image forming apparatus that reversely rotates the fixing roller 41 in the case of the occurrence of the winding jam to solve the condition that the front end of the sheet is wound around the fixing roller 41 once or more has been known as the related art.

Here, in the image forming apparatus according to the related art, the back end of a sheet does not protrude from the fixing nip portion P2 to the upstream side in the conveyance direction D6 of the sheet in some cases after the fixing roller 41 is reversely rotated. Specifically, in a case where the length of a sheet in the conveyance direction D6 is less than the circumference of the fixing roller 41, the back end of the sheet does not protrude from the fixing nip portion P2 to the upstream side in the conveyance direction D6 in the image forming apparatus according to the related art after the fixing roller 41 is reversely rotated.

In a case where the back end of a sheet does not protrude from the fixing nip portion P2 to the upstream side in the conveyance direction D6 (the back end of a sheet is wound around the fixing roller 41) in the case of the occurrence of the winding jam, a user has difficulty in performing an operation of removing the sheet wound around the fixing roller 41.

In contrast, the image forming apparatus 100 according to the embodiment of this disclosure allows an operation of removing a sheet wound around the fixing roller 41 to be facilitated as described below.

[Configuration of Control Portion 7]

Next, the configuration of the control portion 7 will be described with reference to FIG. 2.

As shown in FIG. 2, the control portion 7 includes a setting processing portion 51, a measurement processing portion 52, a stop processing portion 53, a rotation processing portion 54, a depressurization processing portion 55, and a report processing portion 56.

Specifically, the ROM 12 of the control portion 7 stores an operation control program in advance for causing the CPU 11 to function as each of the processing portions described above. The CPU 11 then functions as each of the processing portions described above by executing the operation control program stored in the ROM 12.

It is noted that the operation control program may be recorded in a computer-readable recording medium such as a CD, a DVD, and a flash memory, and read from the recording medium and stored in a storage device such as the storage portion 6. In addition, some or all of the processing portions included in the control portion 7 may be each composed of an electronic circuit. In addition, the operation control program may be a program for causing a plurality of processors to function as the respective processing portions included in the control portion 7.

The setting processing portion 51 sets any of a plurality of speeds defined in advance as the conveyance speed of a sheet in an image formation process of forming an image on a sheet.

For example, the setting processing portion 51 causes the operation display portion 5 to display a speed setting screen used to set the conveyance speed in response to an operation of a user on the operation display portion 5. The operation is defined in advance. The speed setting screen receives a speed setting operation of setting the conveyance speed at any of a first speed that is the highest, a second speed that is the second highest, and a third speed that is the lowest. The setting processing portion 51 sets the conveyance speed in response to the speed setting operation.

The measurement processing portion 52 measures the time elapsed after the timing at which the front end of a sheet in the conveyance direction D6 reaches the fixing nip portion P2 (see FIG. 4) while the image formation process is in execution.

For example, in a case where the time obtained by dividing distance L1 (see FIG. 4) from the sensing position P3 to the fixing nip portion P2 in the conveyance path R1 by the conveyance speed elapses after the timing at which the upstream-side sensor 45 senses the front end of a sheet in the conveyance direction D6, the measurement processing portion 52 determines that the front end of the sheet in the conveyance direction D6 reaches the fixing nip portion P2.

The measurement processing portion 52 continues measuring the time until the downstream-side sensor 46 senses a sheet or the stop processing portion 53 stops the image formation process.

The stop processing portion 53 stops the image formation process of forming an image on the sheet in a case where the downstream-side sensor 46 does not sense the sheet before a specific time defined in advance elapses after the timing at which the front end of the sheet in the conveyance direction D6 reaches the fixing nip portion P2 while the image formation process is in execution.

That is, in a case where the time measured by the measurement processing portion 52 exceeds the specific time, the stop processing portion 53 stops the image formation process.

Here, the specific time is the time corresponding to the conveyance speed set by the setting processing portion 51 among a plurality of time periods (first time, second time, and third time) corresponding to a plurality of the speeds (the first speed, the second speed, and the third speed).

Specifically, the specific time is time defined on the basis of the time obtained by dividing distance L2 (see FIG. 4) from the fixing nip portion P2 to the sensing position P4 in the conveyance path R1 by the conveyance speed. More specifically, the specific time is the time obtained by adding a margin time defined in advance to the time obtained by dividing the distance L2 by the conveyance speed.

In a case where the time measured by the measurement processing portion 52 exceeds the specific time, the image forming apparatus 100 determines that the winding jam occurs.

The rotation processing portion 54 reversely rotates the fixing roller 41 by the amount of rotation corresponding to the difference between a specific distance and the length of the sheet in the conveyance direction D6 in a case where the stop processing portion 53 stops the image formation process and the length of the sheet in the conveyance direction D6 is less than the specific distance. The specific distance is greater than the product of the specific time and the conveyance speed of the sheet.

Specifically, the rotation processing portion 54 rotates the fixing roller 41 in the direction opposite to the rotation direction D8 such that a sheet is conveyed in the direction opposite to the conveyance direction D6 by the difference between the specific distance and the length of the sheet in the conveyance direction D6.

For example, the specific distance is distance greater than the sum of the product and the distance L1 (see FIG. 4) from the upstream-side sensor 45 to the fixing nip portion P2 in the conveyance path R1.

For example, the specific distance is the sum of the product, the distance L1 (see FIG. 4), and the moving distance of a sheet by inertia after the stop of the image formation process. It is noted that the specific distance may be the sum of the product, the moving distance of a sheet by inertia after the stop of the image formation process, and the amount of protrusion of the sheet from the fixing nip portion P2 that allows a user to pinch the back end of the sheet.

For example, the rotation processing portion 54 reversely rotates the fixing roller 41 at the rotation speed corresponding to a specific speed defined in advance among a plurality of the speeds whether the conveyance speed set by the setting processing portion 51 is any of a plurality of the speeds. That is, the time for which the fixing roller 41 is reversely rotated (amount of reverse rotation) is the time obtained by dividing the difference between the specific distance and the length of a sheet in the conveyance direction D6 by the specific speed. The rotation speed at the time of reverse rotation is fixed at the speed corresponding to the specific speed regardless of the conveyance speed. This eliminates the necessity to reference the conveyance distance in calculating the amount of reverse rotation. It is thus possible to simplify a process of calculating the amount of reverse rotation.

For example, the specific speed is the lowest speed (the third speed) of a plurality of the speeds.

It is noted that the length of a sheet in the conveyance direction D6 may be set in advance by an operation of a user on the operation display portion 5 or may be measured using a sensor provided on the upstream side of the secondary transfer position P1 (see FIG. 1) in the conveyance path R1 in the conveyance direction D6.

The depressurization processing portion 55 decreases the pressure at the fixing nip portion P2 after the rotation processing portion 54 finishes reversely rotating the fixing roller 41.

For example, the depressurization processing portion 55 moves the pressure roller 42 from the contact position to the separate position using the movement mechanism 44.

In a case where the stop processing portion 53 stops the image formation process, the report processing portion 56 reports that the winding jam occurs.

For example, the report processing portion 56 causes the operation display portion 5 to display a message indicating that the winding jam occurs.

In addition, in a case where the upstream-side sensor 45 does not sense the back end of a sheet in the conveyance direction D6 before the rotation processing portion 54 finishes reversely rotating the fixing roller 41, the report processing portion 56 makes a report thereof.

For example, the report processing portion 56 causes the operation display portion 5 to display a message indicating that it is not possible to protrude the back end of a sheet from the fixing nip portion P2 to the upstream side in the conveyance direction D6 in spite of reversely rotating the fixing roller 41.

Additionally, in a case where the upstream-side sensor 45 does not sense the back end of a sheet in the conveyance direction D6 before the rotation processing portion 54 finishes reversely rotating the fixing roller 41, the control portion 7 may execute a retry process. The retry process is a process of rotating the fixing roller 41 in the rotation direction D8 by the same amount of rotation as the amount of reverse rotation of the fixing roller 41 by the rotation processing portion 54 and then rotating the fixing roller 41 in the direction opposite to the rotation direction D8 by the same amount of rotation as the amount of reverse rotation of the fixing roller 41 by the rotation processing portion 54. The rotation speed of the fixing roller 41 at the time of the execution of the retry process may be the speed corresponding to the speed different from the specific speed.

[Operation Control Process]

Figure 5:
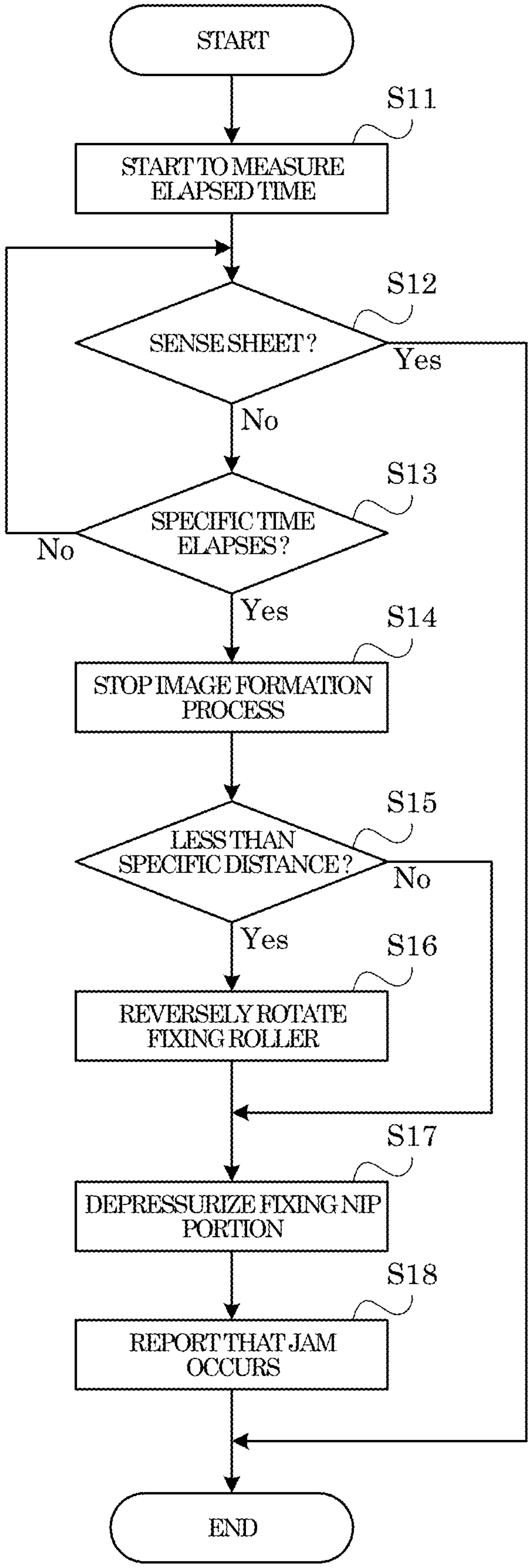
FIG. 5 is a flowchart showing an example of an operation control process that is executed by the image forming apparatus according to the embodiment of this disclosure.

The following describes an operation control method according to this disclosure along with examples of procedures of an operation control process that is executed by the control portion 7 in the image forming apparatus 100 with reference to FIG. 5. Here, steps S11, S12, . . . denote the numbers of processing procedures (steps) that are executed by the control portion 7.

It is noted that the control portion 7 executes the operation control process whenever the front end of a sheet in the conveyance direction D6 reaches the fixing nip portion P2 while the image formation process is in execution.

<Step S11>

First, in step S11, the control portion 7 starts to measure the time elapsed after the timing at which the front end of a sheet in the conveyance direction D6 reaches the fixing nip portion P2 (see FIG. 4). The process of step S11 is executed by the measurement processing portion 52 of the control portion 7.

<Step S12>

In step S12, the control portion 7 determines whether or not the downstream-side sensor 46 senses the front end of a sheet in the conveyance direction D6.

Here, when the control portion 7 determines that the downstream-side sensor 46 senses a sheet (Yes in S12), the control portion 7 stops measuring the elapsed time through the process of step S11 and brings the operation control process to an end. In contrast, if the downstream-side sensor 46 senses no sheet (No in S12), the control portion 7 shifts the process to step S13.

<Step S13>

In step S13, the control portion 7 determines whether or not the elapsed time measured through the process of step S11 exceeds the specific time.

Here, when the control portion 7 determines that the elapsed time measured through the process of step S11 exceeds the specific time (Yes in S13), the control portion 7 stops measuring the elapsed time through the process of step S11 and shifts the process to step S14. In contrast, if the elapsed time measured through the process of step S11 does not exceed the specific time (No in S13), the control portion 7 shifts the process to step S12.

<Step S14>

In step S14, the control portion 7 stops the image formation process. The process of step S14 is an example of a stop step according to this disclosure and is executed by the stop processing portion 53 of the control portion 7.

<Step S15>

In step S15, the control portion 7 determines whether or not the length of a sheet in the conveyance direction D6 is less than the specific distance.

Here, when the control portion 7 determines that the length of a sheet in the conveyance direction D6 is less than the specific distance (Yes in S15), the control portion 7 shifts the process to step S16. In contrast, if the length of a sheet in the conveyance direction D6 is not less than the specific distance (No in S15), the control portion 7 shifts the process to step S17.

<Step S16>

In step S16, the control portion 7 reversely rotates the fixing roller 41 by the amount of rotation corresponding to the difference between the specific distance and the length of a sheet in the conveyance direction D6. The process of step S16 is an example of a rotation step according to this disclosure and is executed by the rotation processing portion 54 of the control portion 7.

Specifically, the control portion 7 uses the drive portion 43 to rotate the fixing roller 41 in the direction opposite to the rotation direction D8 at the rotation speed corresponding to the specific speed for the time obtained by dividing the difference between the specific distance and the length of a sheet in the conveyance direction D6 by the specific speed.

<Step S17>

In step S17, the control portion 7 decreases the pressure at the fixing nip portion P2. The process of step S17 is executed by the depressurization processing portion 55 of the control portion 7. This further facilitates a user to remove a sheet wound around the fixing roller 41.

<Step S18>

In step S18, the control portion 7 reports that the winding jam occurs. The process of step S18 is executed by the report processing portion 56 of the control portion 7.

Specifically, the control portion 7 causes the operation display portion 5 to display a message indicating that the winding jam occurs.

In addition, in a case where the upstream-side sensor 45 does not sense the back end of a sheet in the conveyance direction D6 before the reverse rotation of the fixing roller 41 through the process of step S16 is finished, the control portion 7 causes the operation display portion 5 to display a message indicating that it is not possible to protrude the back end of the sheet from the fixing nip portion P2 to the upstream side in the conveyance direction D6 in spite of reversely rotating the fixing roller 41. This allows a user to recognize that a sheet is wound around the fixing roller 41.

In this way, in a case where the image formation process is stopped because of the occurrence of the winding jam and the length of a sheet in the conveyance direction D6 is less than the specific distance, the fixing roller 41 is reversely rotated in the image forming apparatus 100 by the amount of rotation corresponding to the difference between the specific distance and the length of the sheet in the conveyance direction D6. This makes it possible to protrude the back end of the sheet in the conveyance direction D6 from the fixing nip portion P2 to the upstream side in the conveyance direction D6 regardless of the size of the sheet. It is therefore possible to facilitate an operation of removing a sheet wound around the fixing roller 41.

[Supplementary Notes of Disclosure]

The gist of the disclosure extracted from the embodiment described above will be supplementarily noted below. It is noted that the respective configurations and the respective processing functions described in the following supplementary notes can be sorted out and used in any combination.

<Supplementary Note 1>

An image forming apparatus including:

a fixing member configured to come into contact with a sheet to which a toner image is transferred and fix the toner image onto the sheet, the fixing member being provided so as to be rotatable;

a pressure member provided to be opposed to the fixing member such that the pressure member is rotatable, the pressure member forming a fixing nip portion between the fixing member and the pressure member, the fixing nip portion being configured to pressurize the sheet;

a first sensing portion configured to sense the sheet on a downstream side of the fixing nip portion in a conveyance path of the sheet in a conveyance direction of the sheet, the conveyance path extending through the fixing nip portion;

a stop processing portion configured to stop an image formation process of forming an image on the sheet in a case where the first sensing portion does not sense the sheet before a specific time defined in advance elapses after a timing at which a front end of the sheet in the conveyance direction reaches the fixing nip portion while the image formation process is in execution; and a rotation processing portion configured to reversely rotate the fixing member by an amount of rotation corresponding to a difference between a specific distance and length of the sheet in the conveyance direction in a case where the stop processing portion stops the image formation process and the length is less than the specific distance, the specific distance being greater than a product of the specific time and conveyance speed of the sheet.

<Supplementary Note 2>

The image forming apparatus according to Supplementary Note 1, including a depressurization processing portion configured to decrease pressure at the fixing nip portion after the rotation processing portion finishes reversely rotating the fixing member.

<Supplementary Note 3>

The image forming apparatus according to Supplementary Note 1 or 2, including a second sensing portion configured to sense the sheet on an upstream side of the fixing nip portion in the conveyance path in the conveyance direction, in which the specific distance is distance greater than a sum of the product and distance from the second sensing portion to the fixing nip portion in the conveyance path, and the image forming apparatus includes a report processing portion configured to report that the second sensing portion does not sense a back end of the sheet in the conveyance direction in a case where the second sensing portion does not sense the back end of the sheet in the conveyance direction before the rotation processing portion finishes reversely rotating the fixing member.

<Supplementary Note 4>

The image forming apparatus according to any of Supplementary Notes 1 to 3, including a setting processing portion configured to set any of a plurality of speeds defined in advance as the conveyance speed in the image formation process, in which the specific time is time corresponding to the conveyance speed set by the setting processing portion among a plurality of time periods corresponding to a plurality of the speeds.

<Supplementary Note 5>

The image forming apparatus according to Supplementary Note 4, in which the rotation processing portion reversely rotates the fixing member at a specific speed defined in advance among a plurality of the speeds whether the conveyance speed set by the setting processing portion is any of a plurality of the speeds.

<Supplementary Note 6>

An operation control method that is executed by an image forming apparatus including a fixing member configured to come into contact with a sheet to which a toner image is transferred and fix the toner image onto the sheet, the fixing member being provided so as to be rotatable, a pressure member provided to be opposed to the fixing member such that the pressure member is rotatable, the pressure member forming a fixing nip portion between the fixing member and the pressure member, the fixing nip portion being configured to pressurize the sheet, and a first sensing portion configured to sense the sheet on a downstream side of the fixing nip portion in a conveyance path of the sheet in a conveyance direction of the sheet, the conveyance path extending through the fixing nip portion, the operation control method including:

a stop step of stopping an image formation process of forming an image on the sheet in a case where the first sensing portion does not sense the sheet before a specific time defined in advance elapses after a timing at which a front end of the sheet in the conveyance direction reaches the fixing nip portion while the image formation process is in execution; and a rotation step of reversely rotating the fixing member by an amount of rotation corresponding to a difference between a specific distance and length of the sheet in the conveyance direction in a case where the image formation process is stopped in the stop step and the length is less than the specific distance, the specific distance being greater than a product of the specific time and conveyance speed of the sheet.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a fixing member configured to come into contact with a sheet to which a toner image is transferred and fix the toner image onto the sheet, the fixing member being provided so as to be rotatable;

a pressure member provided to be opposed to the fixing member such that the pressure member is rotatable, the pressure member forming a fixing nip portion between the fixing member and the pressure member, the fixing nip portion being configured to pressurize the sheet;

a first sensing portion configured to sense the sheet on a downstream side of the fixing nip portion in a conveyance path of the sheet in a conveyance direction of the sheet, the conveyance path extending through the fixing nip portion;

a stop processing portion configured to stop an image formation process of forming an image on the sheet in a case where the first sensing portion does not sense the sheet before a specific time defined in advance elapses after a timing at which a front end of the sheet in the conveyance direction reaches the fixing nip portion while the image formation process is in execution; and a rotation processing portion configured to reversely rotate the fixing member by an amount of rotation corresponding to a difference between a specific distance and length of the sheet in the conveyance direction in a case where the stop processing portion stops the image formation process and the length is less than the specific distance, the specific distance being greater than a product of the specific time and conveyance speed of the sheet.

2. The image forming apparatus according to claim 1, comprising a depressurization processing portion configured to decrease pressure at the fixing nip portion after the rotation processing portion finishes reversely rotating the fixing member.

3. The image forming apparatus according to claim 1, comprising a second sensing portion configured to sense the sheet on an upstream side of the fixing nip portion in the conveyance path in the conveyance direction, wherein the specific distance is distance greater than a sum of the product and distance from the second sensing portion to the fixing nip portion in the conveyance path, and the image forming apparatus includes a report processing portion configured to report that the second sensing portion does not sense a back end of the sheet in the conveyance direction in a case where the second sensing portion does not sense the back end of the sheet in the conveyance direction before the rotation processing portion finishes reversely rotating the fixing member.

4. The image forming apparatus according to claim 1, comprising a setting processing portion configured to set any of a plurality of speeds defined in advance as the conveyance speed in the image formation process, wherein the specific time is time corresponding to the conveyance speed set by the setting processing portion among a plurality of time periods corresponding to a plurality of the speeds.

5. The image forming apparatus according to claim 4, wherein the rotation processing portion reversely rotates the fixing member at a specific speed defined in advance among a plurality of the speeds whether the conveyance speed set by the setting processing portion is any of a plurality of the speeds.

6. An operation control method that is executed by an image forming apparatus including a fixing member configured to come into contact with a sheet to which a toner image is transferred and fix the toner image onto the sheet, the fixing member being provided so as to be rotatable, a pressure member provided to be opposed to the fixing member such that the pressure member is rotatable, the pressure member forming a fixing nip portion between the fixing member and the pressure member, the fixing nip portion being configured to pressurize the sheet, and a first sensing portion configured to sense the sheet on a downstream side of the fixing nip portion in a conveyance path of the sheet in a conveyance direction of the sheet, the conveyance path extending through the fixing nip portion, the operation control method comprising:

a stop step of stopping an image formation process of forming an image on the sheet in a case where the first sensing portion does not sense the sheet before a specific time defined in advance elapses after a timing at which a front end of the sheet in the conveyance direction reaches the fixing nip portion while the image formation process is in execution; and a rotation step of reversely rotating the fixing member by an amount of rotation corresponding to a difference between a specific distance and length of the sheet in the conveyance direction in a case where the image formation process is stopped in the stop step and the length is less than the specific distance, the specific distance being greater than a product of the specific time and conveyance speed of the sheet.

* * * * *